United States Patent
Hasunuma et al.

(10) Patent No.: US 9,803,767 B2
(45) Date of Patent: Oct. 31, 2017

(54) FLUID DEVICE UNIT

(71) Applicant: Surpass Industry Co., Ltd., Gyoda-shi (JP)

(72) Inventors: Masahiro Hasunuma, Gyoda (JP); Shouichi Sakata, Gyoda (JP)

(73) Assignee: Surpass Industry Co., Ltd., Gyoda-shi (JP)

( * ) Notice: Subject to any disclaimer, the term of this patent is extended or adjusted under 35 U.S.C. 154(b) by 147 days.

(21) Appl. No.: 14/160,076

(22) Filed: Jan. 21, 2014

(65) Prior Publication Data
US 2014/0203545 A1 Jul. 24, 2014

(30) Foreign Application Priority Data
Jan. 24, 2013 (JP) .................................. 2013-011236

(51) Int. Cl.
*F16L 25/00* (2006.01)
*F16K 27/02* (2006.01)

(52) U.S. Cl.
CPC .................................. *F16K 27/02* (2013.01)

(58) Field of Classification Search
USPC ................................ 285/61, 67, 103, 325, 24
See application file for complete search history.

(56) References Cited

U.S. PATENT DOCUMENTS

| | | | | |
|---|---|---|---|---|
| 714,311 A | * | 11/1902 | Lee | F16L 37/26 285/67 |
| 2006/0103134 A1 | | 5/2006 | Kerin | |
| 2010/0018993 A1 | * | 1/2010 | Nakano | B67D 1/0807 222/83 |
| 2010/0242918 A1 | * | 9/2010 | Okuno | F02M 47/027 123/470 |
| 2010/0244433 A1 | * | 9/2010 | Okuno | F02M 55/02 285/24 |
| 2010/0244434 A1 | * | 9/2010 | Okuno | F16L 37/101 285/24 |
| 2011/0127766 A1 | | 6/2011 | Tsurumi | |

FOREIGN PATENT DOCUMENTS

| | | |
|---|---|---|
| CN | 101493156 A | 7/2009 |
| CN | 101493156 B | 7/2009 |
| CN | 101493156 B | 6/2011 |
| EP | 1801484 A1 | 6/2007 |
| GB | 2274887 A | 8/1994 |
| JP | S61152809 U | 9/1986 |
| JP | S62177972 U | 11/1987 |
| JP | H0211212 U | 1/1990 |
| JP | 2004094400 A | 3/2004 |
| JP | 2005147384 A | 6/2005 |

* cited by examiner

Primary Examiner — Aaron Dunwoody
(74) Attorney, Agent, or Firm — Winstead PC

(57) ABSTRACT

Either the base part or the coupling part includes a first coupling member which is substantially circular in cross-section in a radial direction perpendicular to the central axis and has a diameter of a first length, while the other of the base part and the coupling part includes a first holding member which, with its inner circumferential surface having a substantially circular shape in cross-section in the radial direction, holds the first coupling member so as to surround its outer circumferential surface. The inner circumferential surface of the first holding member is partially opened in the radial direction, and an opening width of an opening part of the first holding member, which is elastically deformable, is narrower than the first length.

12 Claims, 8 Drawing Sheets

FLUID DEVICE UNIT

CROSS-REFERENCE TO RELATED APPLICATIONS

This application is based on Japanese Patent Application No. 2013-011236, the contents of which are incorporated herein by reference.

TECHNICAL FIELD

The present invention relates to a fluid device unit.

BACKGROUND ART

Conventionally, a method for fixing a fluid device unit to an installation surface is known, in which a through-hole is bored in a base part provided at a bottom of the fluid device unit, and a fastening bolt is inserted from above the through-hole (e.g., see PTL 1). When seen in plan view from above the fluid device unit, the fluid device unit with the through-hole bored in the base part assumes a shape in which the base part, where the through-hole is bored, protrudes from a main body part of the fluid device unit.

Another known method involves boring a fastening hole in a bottom surface of the fluid device unit and inserting a fastening bolt from below the installation surface, where a through-hole is bored, to fasten the bolt to the fastening hole.

CITATION LIST

Patent Literature

{PTL 1}
Japanese Unexamined Patent Application, Publication No. 2004-94400

SUMMARY OF INVENTION

Technical Problem

However, according to the method of inserting the fastening bolt from above the through-hole of the base part, the base part having the through-hole protrudes from the main body part of the fluid device unit, which makes an installation area (footprint) of the fluid device unit larger.

On the other hand, according to the method of inserting the fastening bolt from below the installation surface, it is not easy to mount/dismount the fluid device unit on/from the installation surface due to the necessity of working below the installation surface.

The present invention has been made in view of the above situation, and an object thereof is to provide a fluid device unit which requires a smaller installation area (footprint) and is easy to mount/dismount on/from the installation surface.

Solution to Problem

In order to achieve the above object, the present invention has adopted the following solutions.

A fluid device unit according to the present invention includes: a main body part which has a passage for allowing a fluid flowing in from an inflow port to flow out of an outflow port, and extends in a direction of a central axis; a base part which is fixed to an installation surface; and a coupling part which is provided at one end side of the main body part and dismountably couples the main body part to the base part. Either the base part or the coupling part includes a first coupling member which is substantially circular in cross-section in a radial direction perpendicular to the central axis and has a diameter of a first length, while the other of the base part and the coupling part includes a first holding member which, with its inner circumferential surface having a substantially circular shape in cross-section in the radial direction, holds the first coupling member so as to surround its outer circumferential surface. The inner circumferential surface of the first holding member is partially opened in the radial direction, and an opening width of an opening part of the first holding member, which is elastically deformable, is narrower than the first length.

In the fluid device unit according to the present invention, the inner circumferential surface of the first holding member of the base part fixed to the installation surface is partially opened in the radial direction. The opening width of the opening part of the elastically deformable first holding member is narrower than the first length being the diameter of the first coupling member of the coupling part which dismountably couples the main body part to the base part. Therefore, when the first coupling member of the coupling part is pressed against the opening part of the first holding member of the base part in a direction of entering the opening part, the first holding member is elastically deformed to gradually widen the opening width, allowing the first coupling member to enter the opening part. After a portion having the first length of the largest width of the first coupling member passes through the opening part, the opening width of the elastically deformed opening part gradually narrows. This results in a state where the first coupling member is held with its outer circumferential surface being surrounded by the inner circumferential surface of the first holding member.

In this state, the first coupling member is held with its outer circumferential surface being surrounded by the inner circumferential surface of the first holding member. Accordingly, the main body part is held so as not to move in the radial direction perpendicular to the central axis of the main body part.

In this way, the fluid device unit is mounted on the installation surface just by such a simple action as pressing the first coupling member of the coupling part against the opening part of the first holding member of the base part in the direction of entering the opening part. Similarly, the fluid device unit is removed from the installation surface just by such a simple action as pressing the first coupling member of the coupling part against the opening part of the first holding member of the base part in a direction of exiting from the opening part. Thus, it is possible to provide a fluid device unit which requires a small installation area (footprint) and is easy to mount/dismount on/from the installation surface.

In another aspect of the fluid device unit according to the present invention, the coupling part may include, in order from a side closer to the main body part, the first coupling member and a second coupling member which is substantially circular in cross-section in the radial direction and has a diameter of a second length longer than the first length, while the base part may include, in order from a side closer to the main body part, the first holding member and a second holding member which, with its inner circumferential surface having a substantially circular shape in cross-section in the radial direction, holds the second coupling member so as to surround its outer circumferential surface. The inner circumferential surface of the second holding member may be partially opened in the radial direction, and an opening width of an opening part of the second holding member may be wider than the opening width of the opening part of the first holding member.

In the fluid device unit with the above configuration, when the first coupling member is held with its outer circumferential surface being surrounded by the inner circumferential surface of the first holding member, the second coupling member is held with its outer circumferential surface being surrounded by the inner circumferential surface of the second holding member.

In this state, the second coupling member is held with its outer circumferential surface being surrounded by the inner circumferential surface of the second holding member, and the diameter of the second coupling member (second length) is longer than the diameter of the first holding member (first length) surrounding the first coupling member. Accordingly, a surface of the second coupling member on the main body part side is restricted by a surface of the first holding member on the installation surface side, and the main body part is held so as not to move in a direction along the central axis.

In this way, the fluid device unit is mounted on the installation surface just by such a simple action as pressing the first coupling member of the coupling part against the opening part of the first holding member of the base part in the direction of entering the opening part. Similarly, the fluid device unit is removed from the installation surface just by such a simple action as pressing the first coupling member of the coupling part against the opening part of the first holding member of the base part in the direction of exiting from the opening part. Thus, it is possible to provide a fluid device unit which requires a small installation area (footprint) and is easy to mount/dismount on/from the installation surface.

In another aspect of the above invention, the base part may include a through-hole into which a fastening tool to be fastened to a fastening hole of the installation surface is inserted, and in a state where the main body part is coupled to the base part, a central axis of the through-hole and the central axis of the main body part may coincide with each other.

In this way, in a state where the main body part is coupled to the base part, a position on the installation surface of the through-hole, into which the fastening tool for installing the base part on the installation surface is inserted, and a position on the installation surface of the main body part coincide with each other. Therefore, compared with a case where the positions on the installation surface of the through-hole and the main body part differ from each other, as in the conventional case, the installation area (footprint) of the fluid device unit can be reduced.

In the above aspect, the base part may include a support member which has a substantially circular shape in cross-section in the radial direction, and is fixed to the installation surface to support the first holding member and the second holding member. A ridge which extends along an opening direction of the opening part of the first holding member may be provided on a surface of the support member opposite to the second coupling member, and a groove which engages with the ridge may be provided on a surface of the second coupling member opposite to the support member.

In this configuration, in a state where the groove provided in the second coupling member is engaged with the ridge provided in the support member, the first coupling member enters the opening part of the first holding member. Since the ridge extends along the opening direction of the opening part of the first holding member, arrangement of the main body part relative to the base part (angle of the main body part around the central axis) is set in a predetermined state.

In this way, the arrangement of the main body part relative to the base part to be fixed to the installation surface (angle of the main body part around the central axis) can be set in a predetermined state without the need for a worker to make complicated adjustment.

In the above configuration, the inflow port and the outflow port may be arranged on the same straight line along the radial direction, and the direction along the same straight line and an extending direction of the groove may coincide with each other.

In a case where the fluid device unit is connected to each of a plurality of pipes, the pipes are usually arranged adjacent to each other in order to reduce the installation area. In this case, it is necessary to mount/dismount the fluid device unit, which is connected to one of the pipes, in such a manner as to avoid contact with the adjacent pipes or the other fluid device units connected to these pipes.

The above-described configuration makes it possible to mount/dismount the main body part on/from the base part in an extending direction of the pipe to which the fluid device unit is connected, while avoiding contact with the adjacent pipes or the fluid device units connected to these pipes.

In the above aspect, the base part may include a projection which engages with an engaging hole of the installation surface.

In this way, as the base part is fixed to both of the fastening hole and the engaging hole of the installation surface, the base part can be reliably fixed so as not to rotate relative to the installation surface.

In the above invention, the coupling part may include a restricting member which, in a state where the first coupling member is held by the first holding member, restricts the main body part from rotating around the central axis relative to the base part.

In this way, the main body part can be prevented from rotating around the central axis relative to the base part.

In the above aspect, a fastening hole to which a fastening tool can be fastened may be provided in a bottom surface of the second coupling member.

In this way, even when the base part is not fixed to the installation surface, the main body part can be fixed to the installation surface by protruding a tip of the fastening tool from the through-hole provided in the installation surface and fastening the tip to the fastening hole of the second coupling member.

In the above invention, the main body part may include an opening-closing mechanism which switches the passage between open and closed states.

Advantageous Effects of Invention

According to the present invention, it is possible to provide a fluid device unit which requires a small installation area (footprint) and is easy to mount/dismount on/from the installation surface.

BRIEF DESCRIPTION OF DRAWINGS

FIG. 1(a), FIG. 1(b), and FIG. 1(c) are a front view, a right-side view, and a back view, respectively.

FIG. 3(a), FIG. 3(b), and FIG. 3(c) are a front view, a right-side view, and a back view, respectively.

FIG. 5(a) is a front view in a direction of a central axis of a main body part and FIG. 5(b) is a right-side view.

FIG. 6(a) is a view showing a state before mounting, FIG. 6(b) is a view showing a state during mounting, and FIG. 6(c) is a view showing a state after mounting.

FIG. 7(a) is a view showing a state before mounting, FIG. 7(b) is a view showing a state during mounting, and FIG. 7(c) is a view showing a state after mounting.

DESCRIPTION OF EMBODIMENTS

First Embodiment

Figure 1:
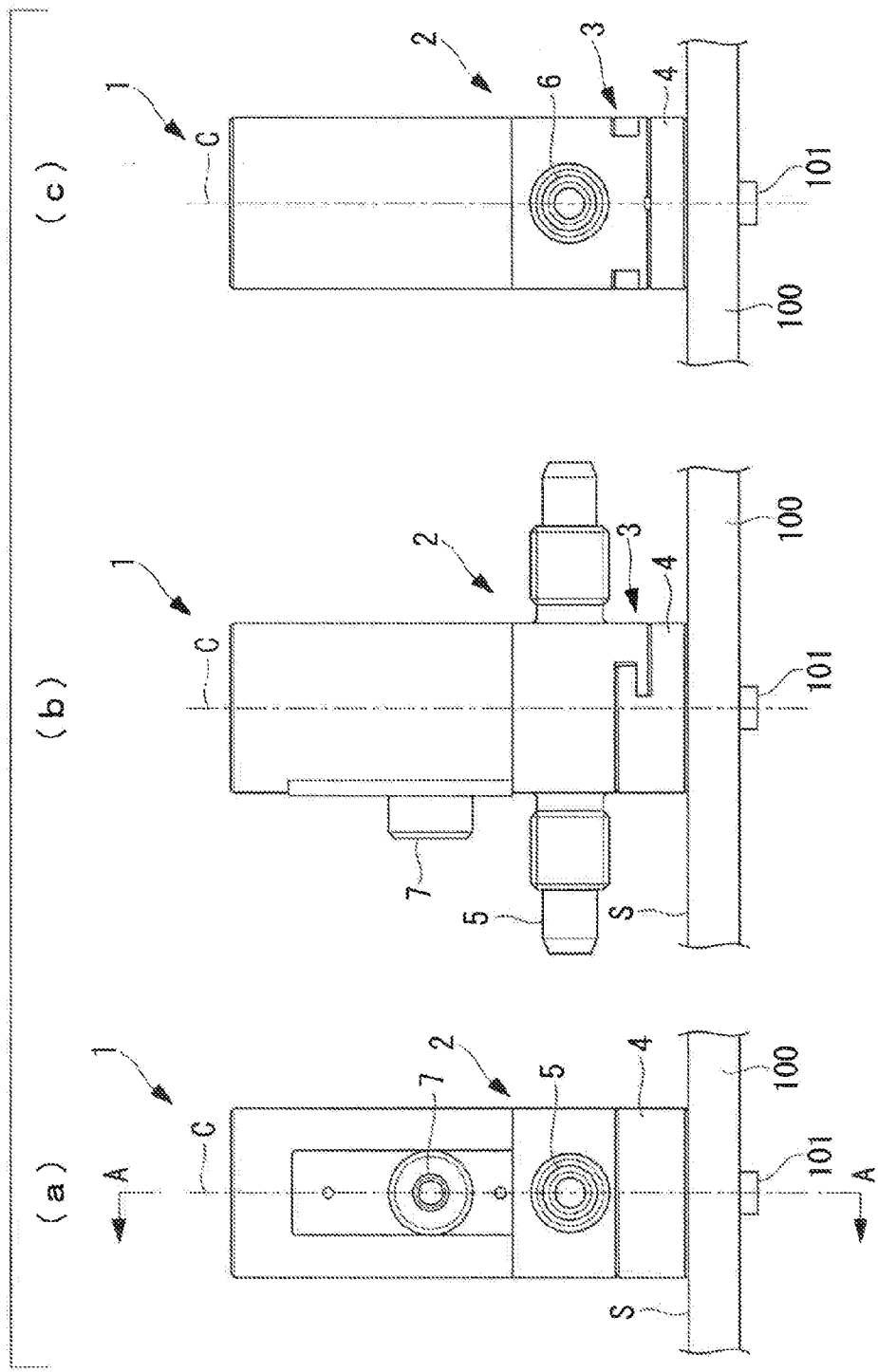
FIG. 1 is a view showing a fluid device unit of a first embodiment of the present invention, where

Hereinafter, a fluid device unit of a first embodiment of the present invention will be described based on the drawings. FIG. 1 is a view showing the fluid device unit of the first embodiment of the present invention, where FIG. 1(a), FIG. 1(b), and FIG. 1(c) are a front view, a right-side view, and a back view, respectively.

A fluid device unit 1 shown in FIG. 1 is a device which is installed in a pipe passage for a fluid, such as a chemical, used in a semiconductor manufacturing device. The fluid device unit 1 includes a main body part 2, a coupling part 3, a base part 4, an inflow port 5, an outflow port 6, and an air inflow port 7.

The main body part 2 has a passage (an inflow passage 12 and an outflow passage 13 to be described later) which allows a fluid flowing in from the inflow port 5 to flow out of the outflow port 6. The main body part 2 has a substantially cylindrical shape extending along a direction of a central axis C.

The base part 4 is a substantially cylindrical member which is fixed to an installation surface S of a casing 100 where the fluid device unit 1 is to be installed. The casing 100 is provided with a fastening hole with a female thread on its inner circumferential surface. The base part 4 is fixed to the installation surface S by a fastening bolt 101 (fastening tool), which is inserted in a through-hole of the base part 4, being fastened to the fastening hole.

The coupling part 3 is a member which is provided at one end side of the main body part 2 (side closer to the installation surface S in the direction of the central axis C), and dismountably couples the main body part 2 to the base part 4. The coupling part 3 and the base part 4 will be described in detail later. In the present embodiment, the coupling part 3, together with the inflow port 5 and the outflow port 6, is integrally formed with the main body part 2.

The air inflow port 7 is an inflow port for the air which generates air pressure for actuating an opening-closing mechanism of the passage provided inside the main body part 2. The air is supplied to the air inflow port 7 through an air passage (not shown) connected to an air source (not shown).

Figure 2:
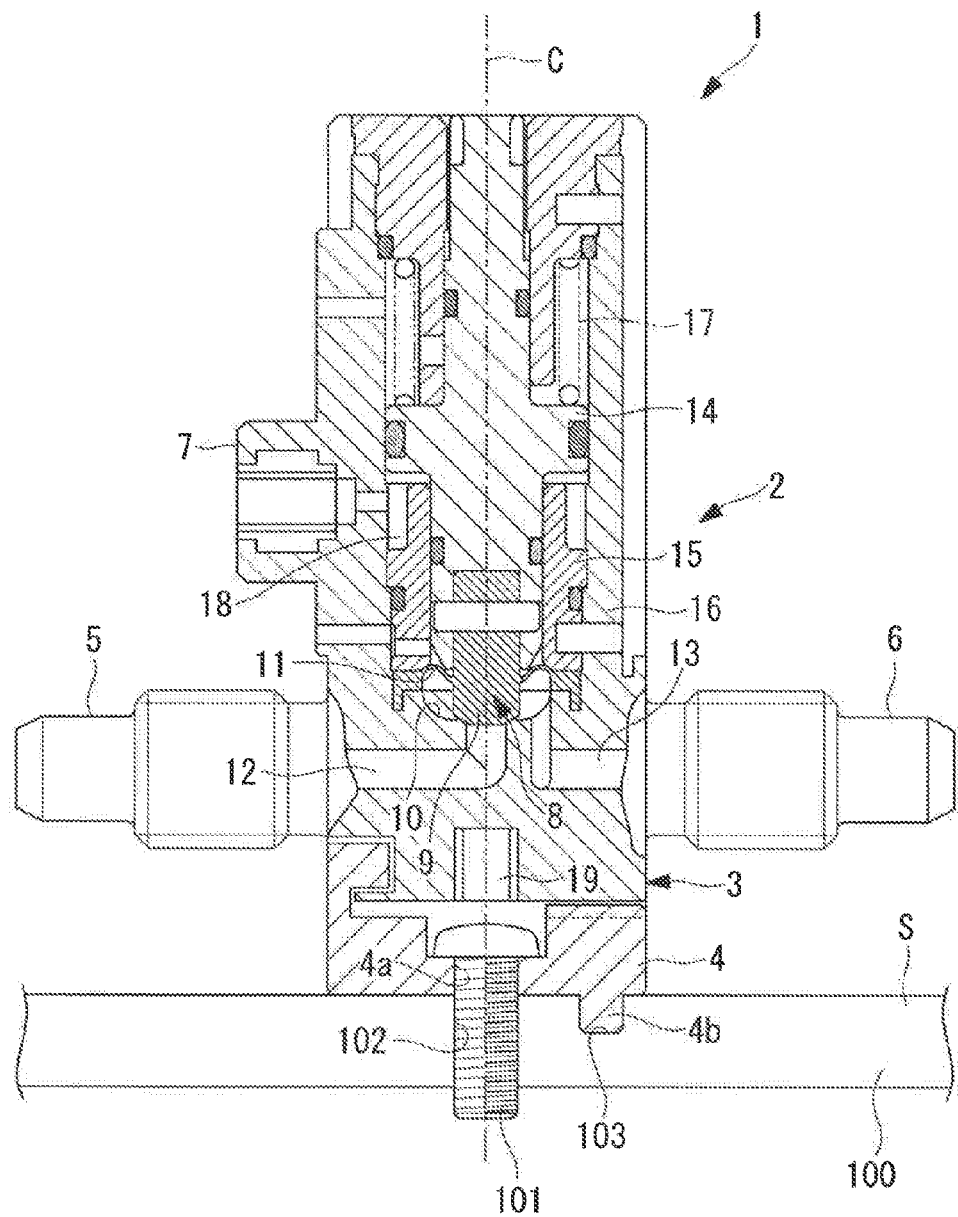
FIG. 2 is a cross-sectional view in a direction of the arrow A-A of the fluid device unit shown in FIG. 1(a).

Next, an internal structure of the main body part 2 of the fluid device unit 1 will be described using FIG. 2. FIG. 2 is a cross-sectional view in the direction of the arrow A-A of the fluid device unit shown in FIG. 1(a). The fluid device unit 1 of the first embodiment is a normally-closed air-operated valve which switches to a closed state when pressure of the supplied air is low.

The main body part 2 shown in FIG. 2 is a resin member including an opening-closing mechanism 8 which moves a valve disc 9 in a vertical direction so as to contact a valve seat 10 or separate from it. A diaphragm 11 is coupled to the valve disc 9, and the fluid passage is isolated from the rest of the main body part by the diaphragm 11. In a state where the opening-closing mechanism 8 keeps the valve disc 9 in contact with the valve seat 10, the fluid device unit 1 is in the closed state where the fluid flowing in from the inflow port 5 does not flow from the inflow passage 12 to the outflow passage 13. On the other hand, in a state where the opening-closing mechanism 8 keeps the valve disc 9 separated from the valve seat 10, the fluid device unit 1 is in an open state where the fluid flowing in from the inflow port 5 flows through the inflow passage 12 to the outflow passage 13. In the open state, the fluid flowing into the outflow passage 13 flows through the outflow port 6 out to the pipe passage (not shown).

The valve disc 9 is coupled to a piston 14, and integrally moves up and down with the piston 14 in the direction of the central axis C. A valve body 16 is a resin member with the inflow passage 12 and the outflow passage 13 formed inside thereof, and includes a cylindrical part for housing the piston 14. A piston support 15 is fixed to an inner surface of the cylindrical part of the valve body 16. The piston support 15 is a member which allows the piston 14 to move in the direction of the central axis C. The shape of an inner circumferential surface of the piston support 15 is substantially the same as the shape of an outer circumferential surface of the piston 14.

A biasing force is applied by a coil spring 17 to the piston 14 in a direction of pressing the coil spring 17 along the central axis C toward the installation surface S side. Due to this biasing force, when the air pressure generated by the air supplied to the air inflow port 7 is low, the fluid device unit 1 is brought into the closed state where the valve disc 9 is in contact with the valve seat 10. The air flowing in from the air inflow port 7 is supplied into a pressurizing chamber 18 which is defined by the piston 14, the piston support 15, and the valve body 16. The air pressure generated by the air supplied into the pressurizing chamber 18 is adjusted by the air source (not shown).

The air pressure in the pressurizing chamber 18 acts on the piston 14 and applies a biasing force to the piston 14 in a direction of moving the piston 14 away from the installation surface S along the central axis C. When the air pressure in the pressurizing chamber 18 increases and the biasing force in the direction of moving the piston 14 away from the installation surface S along the central axis C exceeds the biasing force applied by the coil spring 17, the piston 14 moves in the direction away from the installation surface S along the central axis C. This movement leaves the valve disc 9 in a state of being separated from the valve seat 10, bringing the fluid device unit 1 into the open state where the fluid flowing in from the inflow port 5 flows through the inflow passage 12 to the outflow passage 13.

Next, the base part 4 will be described.

The base part 4 includes a through-hole 4a into which a fastening bolt 101 to be fastened to a fastening hole 102 of the installation surface S is inserted. The fastening bolt 101 and the fastening hole 102 are fastened together by engagement between the female thread provided on an inner surface of the fastening hole 102 and a male thread provided in the fastening bolt 101.

Furthermore, the base part 4 includes a rotation preventing pin 4b (projection) which engages with an engaging hole 103 of the installation surface S. By additionally engaging the rotation preventing pin 4b and the engaging hole 103, the base part 4 fixed to the installation surface S with the fastening bolt 101 is reliably fixed so as not to rotate relative to the installation surface S. The main body part 2 and the base part 4 are coupled together by the coupling part 3 provided at the one end side of the main body part 2 (side closer to the installation surface S in the direction of the central axis C).

Next, the coupling part 3 will be described in detail using FIG. 3 and FIG. 4.

Figure 3:
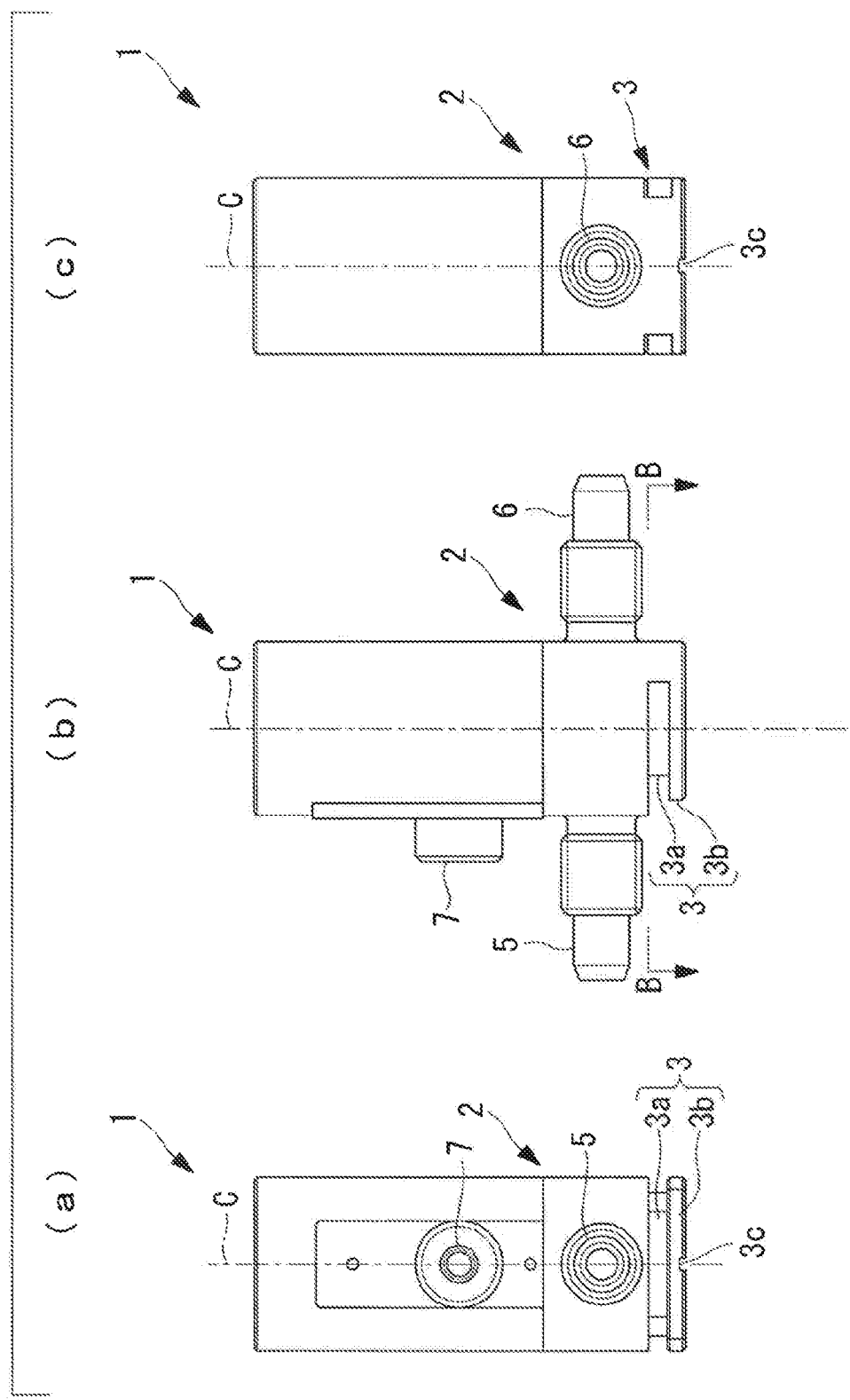
FIG. 3 is a view showing the fluid device unit with a base part removed, where

FIG. 3 is a view showing the fluid device unit 1 with the base part 4 removed, where FIG. 3(a), FIG. 3(b), and FIG. 3(c) are a front view, a right-side view, and a back view, respectively.

Figure 6:
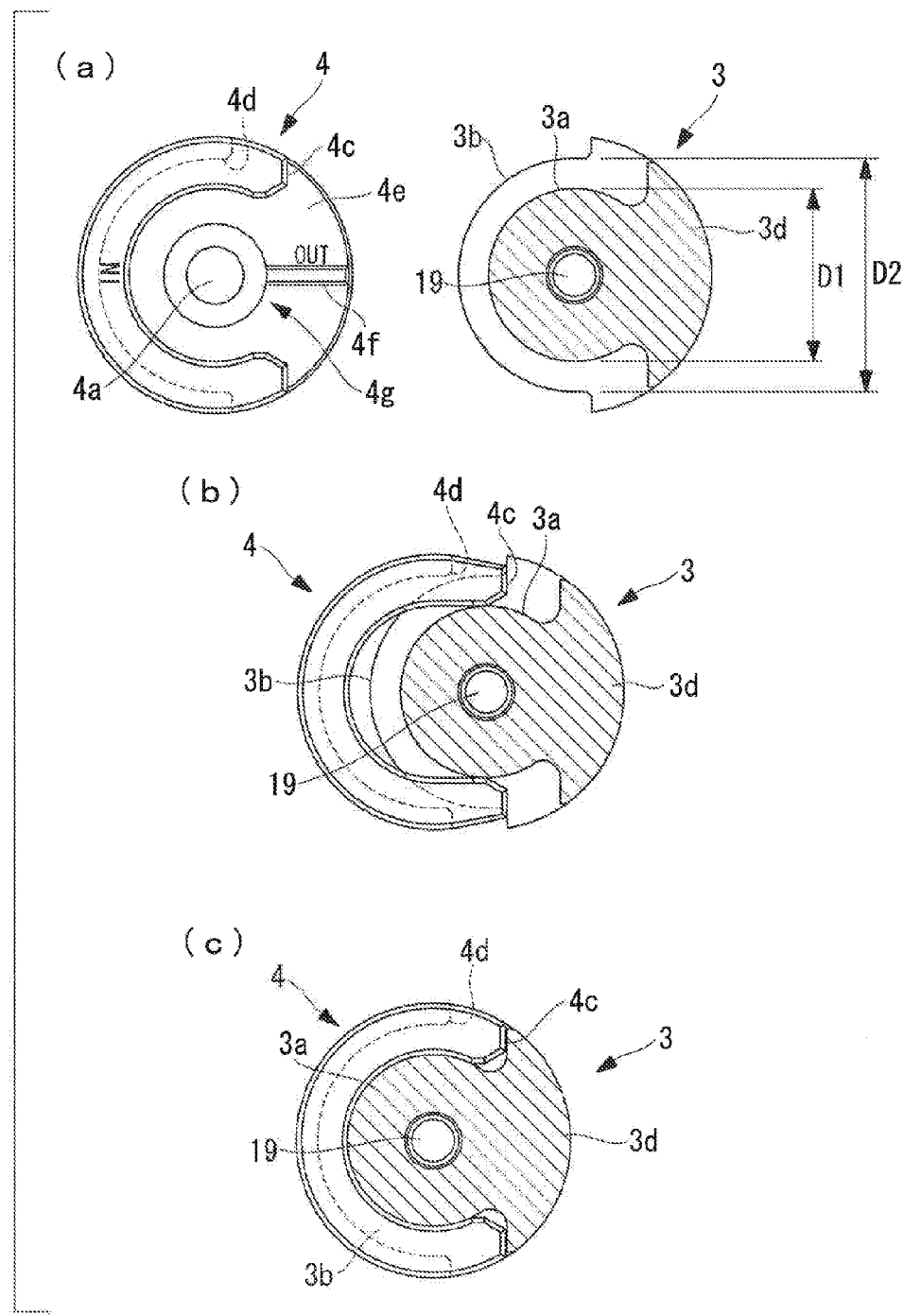
FIG. 6 is a view showing states of mounting/dismounting of a coupling part on/from the base part, where

As shown in FIG. 3, the coupling part 3 includes a first coupling member 3a and a second coupling member 3b in this order from a side closer to the main body part 2. As shown in FIG. 6 to be described later, the first coupling member 3a and the second coupling member 3b are members each having a substantially circular shape in cross-section in a radial direction perpendicular to the central axis C.

As shown in FIG. 3(a) and FIG. 3(c), a groove 3c, which engages with a ridge 4f of the base part 4 to be described later, is provided at the installation surface S side of the second coupling member 3b (on a surface opposite to a support member 4e to be described later). The groove 3c extends in a direction of the straight line connecting the inflow port 5 and the outflow port 6. Thus, the direction along the straight line connecting the inflow port 5 and the outflow port 6 and the extending direction of the groove 3c coincide with each other.

Figure 4:
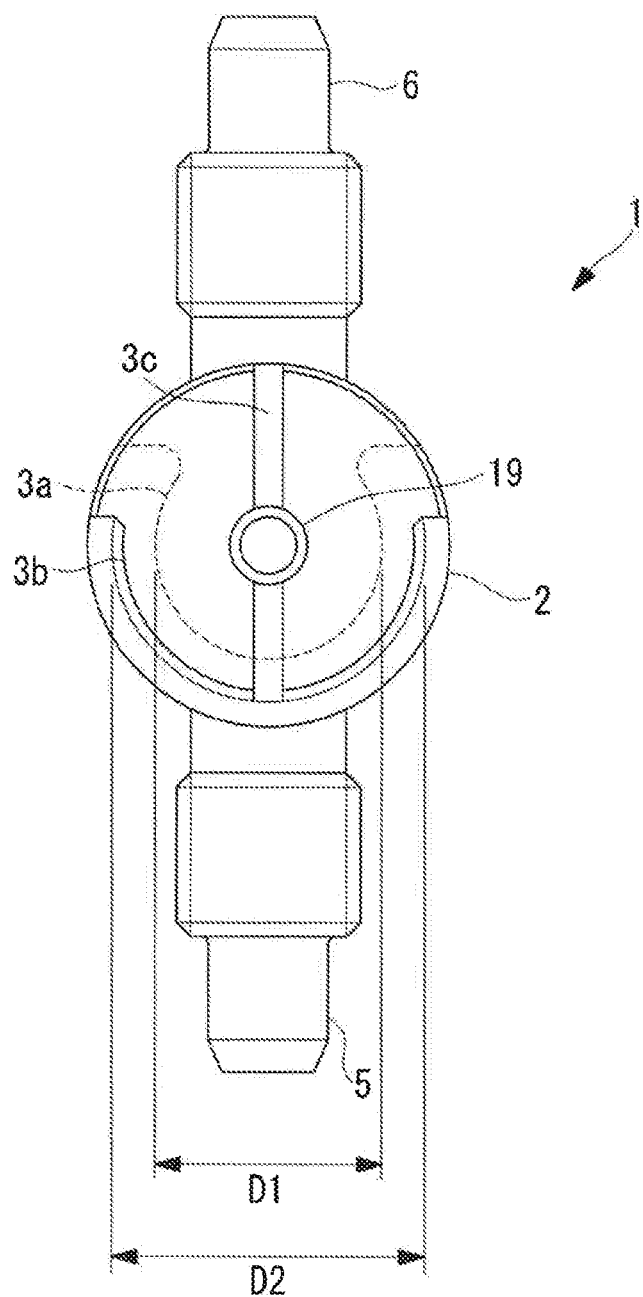
FIG. 4 is a bottom view showing the fluid device unit with the base part removed.

FIG. 4 is a bottom view showing the fluid device unit 1 with the base part 4 removed. As shown in FIG. 4, the groove 3c extends in the direction of the straight line connecting the inflow port 5 and the outflow port 6. As shown in FIG. 4, a diameter of the first coupling member 3a has a first length D1, while a diameter of the second coupling member 3b has a second length D2 longer than the first length D1.

As shown in FIG. 4, a fastening hole 19 to which the fastening bolt can be fastened is provided in a bottom surface of the second coupling member 3b (surface at the installation surface S side). This fastening hole 19 is used for fixing the coupling part 3 to the installation surface S without using the base part 4. The coupling part 3 is fixed to the installation surface S by inserting the fastening bolt into the through-hole (not shown), which is provided in the installation surface S, so as to protrude a tip of the fastening bolt from the installation surface S, and fastening the tip of the fastening bolt to the fastening hole 19.

Next, the base part 4 will be described in detail using FIG. 5.

Figure 5:
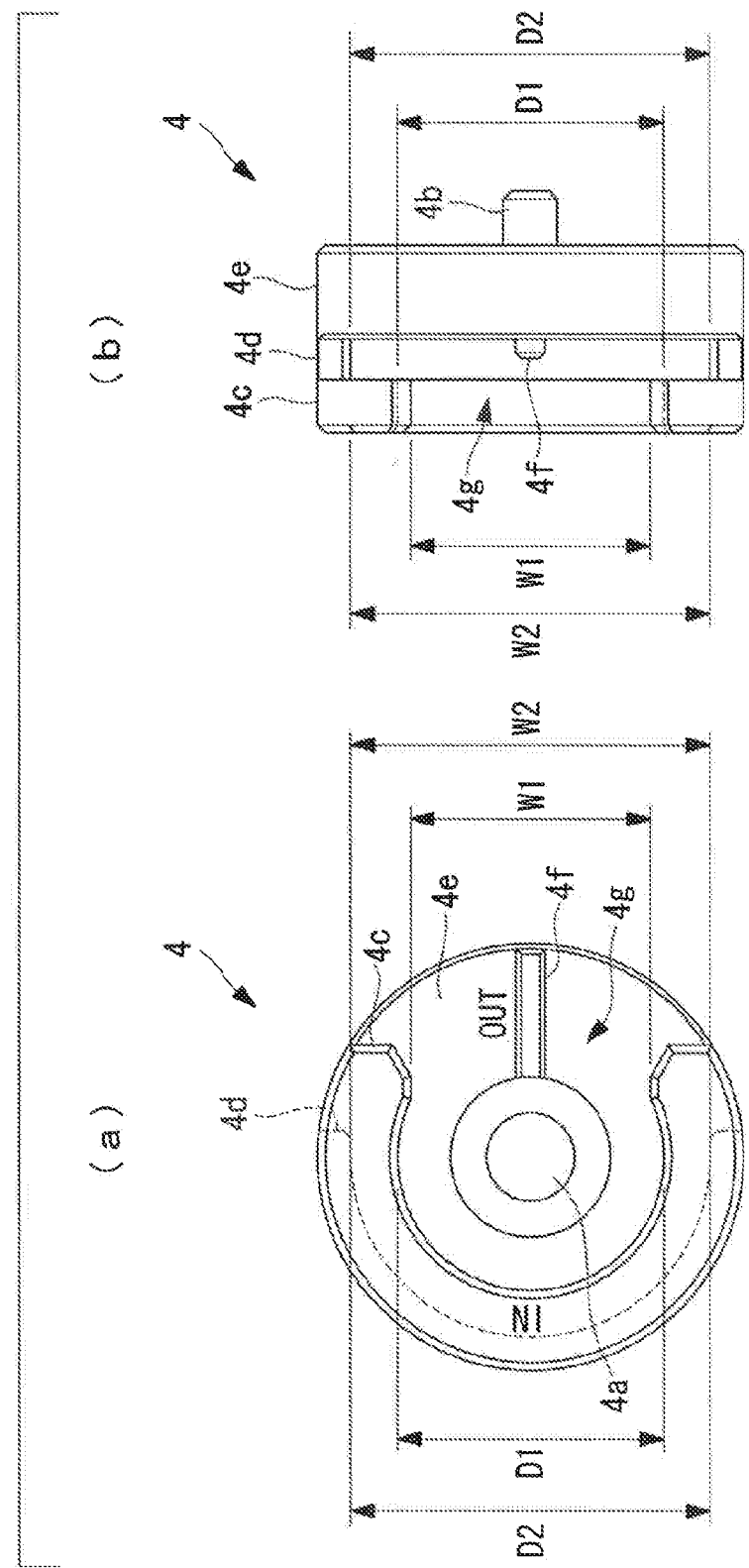
FIG. 5 is a view showing the base part, where

FIG. 5 is a view showing the base part 4, where FIG. 5(a) is a front view of the main body part 2 in the direction of the central axis C and FIG. 5(b) is a right-side view.

As shown in FIG. 5, the base part 4 includes a first holding member 4c, a second holding member 4d, and the support member 4e, in this order from a side closer to the main body part 2 (side farther from the installation surface S). The first holding member 4c, the second holding member 4d, and the support member 4e are members each having a substantially circular shape in cross-section in the radial direction perpendicular to the central axis C.

The ridge 4f which extends along an opening direction (to the right in FIG. 5(a)) of an opening part 4g of the first holding member 4c is provided on an upper surface of the support member 4e (surface opposite to the second coupling member 3b).

The base part 4 includes the through-hole into which the fastening bolt 101 to be fastened to the fastening hole 102 of the installation surface S is inserted. As shown in FIG. 2, in a state where the main body part 2 is coupled to the base part 4, a central axis of the through-hole 4a and the central axis C of the main body part 2 coincide with each other.

As shown in FIG. 5, an inner circumferential surface of the first holding member 4c is partially opened (to the right in FIG. 5(a)) in the radial direction perpendicular to the central axis C. The first holding member 4c is constituted of an elastically deformable material such as a resin. The diameter of the inner circumferential surface of the first holding member 4c has the first length D1, and an opening width W1 of the opening part 4g is narrower than the first length D1.

Furthermore, as shown in FIG. 5, an inner circumferential surface of the second holding member 4d is partially opened (to the right in FIG. 5(a)) in the radial direction perpendicular to the central axis C. A width of the opening part of the second holding member 4d is W2, and the opening width W2 is wider than the opening width W1. In the present embodiment, the opening width W2 and the second length D2 are nearly equal.

In the present embodiment, the opening width W1 of the first holding member 4c is narrower by 10% than the first length D1. This means W1/D1=0.9. However, the value of W1/D1 is not limited to 0.9, but various values can be adopted depending on the shape of the first holding member 4c and the elasticity, etc. of the resin used as the material.

Next, mounting/dismounting of the coupling part 3 on/from the base part 4 will be described using FIG. 6.

FIG. 6 is a view showing states of the coupling part 3 mounted/dismounted on/from the base part 4, where FIG. 6(a) is a view showing a state before mounting, FIG. 6(b) is a view showing a state during mounting, and FIG. 6(c) is a view showing a state after mounting. The base part 4 in FIG. 6 is shown in a front view in the direction of the central axis C of the main body part 2. The coupling part 3 in FIG. 6 is shown in a cross-sectional view in a direction of the arrow B-B of FIG. 3(b).

As shown in FIG. 6(a), the first coupling member 3a is substantially circular in cross-section in the radial direction perpendicular to the central axis C, and has a diameter of the first length D1. The second coupling member 3b is substantially circular in cross-section in the radial direction perpendicular to the central axis C, and has a diameter of the second length D2.

Furthermore, as shown in FIG. 6(c), the first holding member 4c, with its inner circumferential surface having a substantially circular shape in cross-section in the radial direction perpendicular to the central axis C, holds the first coupling member 3a so as to surround its outer circumferential surface. The second holding member 4d, with its inner circumferential surface having a substantially circular shape in cross-section in the radial direction perpendicular to the central axis C, holds the second coupling member 3b so as to surround its outer circumferential surface.

Here, the substantially circular shape means a circular shape of the portion except for a restricting member 3d.

When the main body part 2 is to be mounted on the base part 4 fixed to the installation surface S of the casing 100, a worker performs the following actions:

First, while grasping the main body part 2, the worker turns the direction, where the first coupling member 3a and the second coupling member 3b are located, toward the opening part 4g of the holding member 4c. At this time, although the coupling part 3 is not readily visible, the worker can easily determine the direction of the main body part 2 by checking the indications at the base part 4 ("IN" and "OUT" stamps). That is, the direction of the main body part 2 can be easily determined by turning the inflow port 5 to the left in FIG. 6(a) and turning the outflow port 6 to the right in FIG. 6(a).

When the worker brings a lower surface of the second coupling member 3b into contact with the ridge 4f provided on the upper surface of the support member 4e, the groove 3c provided in the lower surface of the second coupling member 3b engages with the ridge 4f. The worker enters the main body part 2 toward the opening part 4g in a state where the groove 3c is engaged with the ridge 4f, and brings the outer circumferential surface of the first coupling member 3a into contact with the first holding member 4c.

When the worker presses the main body part 2 against the opening part 4g in a state where the outer circumferential surface of the first coupling member 3a is in contact with the first holding member 4c, the first holding member 4c is elastically deformed to gradually widen the opening width W1, which results in the state shown in FIG. 6(b). When the worker further presses the main body part 2 against the opening part 4g from the state shown in FIG. 6(b), the portion having the largest width (first length D1) of the first coupling member 3a passes through the opening part 4g.

After the portion having the first length D1 of the first coupling member 3a passes through the opening part 4g, the opening width W1 of the elastically deformed opening part 4g gradually narrows. This results in the state shown in FIG. 6(c) where the first coupling member 3a is held with its outer circumferential surface being surrounded by the inner circumferential surface of the first holding member 4c. In the state shown in FIG. 6(c), the first coupling member 3a is held with its outer circumferential surface being surrounded by the inner circumferential surface of the first holding member 4c. Accordingly, the main body part 2 is held so as not to move in the radial direction perpendicular to the central axis C of the main body part 2.

In the state shown in FIG. 6(c), the second coupling member 3b is held with its outer circumferential surface being surrounded by the inner circumferential surface of the second holding member 4d. In the state shown in FIG. 6(c), the second coupling member 3b is held with its outer circumferential surface being surrounded by the inner circumferential surface of the second holding member 4d, and the diameter of the second coupling member 3b (second length D2) is larger than the diameter of the first holding member 4c (first length D1) surrounding the first coupling member 3a. Therefore, the surface of the second coupling member 3b on the main body part 2 side is restricted by the surface of the first holding member 4c on the installation surface S side, and the main body part 2 is held so as not to move in the direction along the central axis C.

In the state shown in FIG. 6(c), both ends of the restricting member 3d of the coupling part 3 are respectively in contact with the opening ends of the first holding member 4c. In other words, the main body part 2, which is integrally formed with the restricting member 3d, is restricted by the restricting member 3d from rotating around the central axis C relative to the base part 4.

The preceding is a description of the actions performed by the worker to mount the main body part 2 on the base part 4 fixed to the installation surface S of the casing 100. To remove the main body part 2 from the base part 4 fixed to the installation surface S of the casing 100, the worker may perform the reverse actions to the above-described actions. Namely, the worker may perform an action of moving the main body part 2 to the right in FIG. 6 while grasping the main body part 2.

Figure 7:
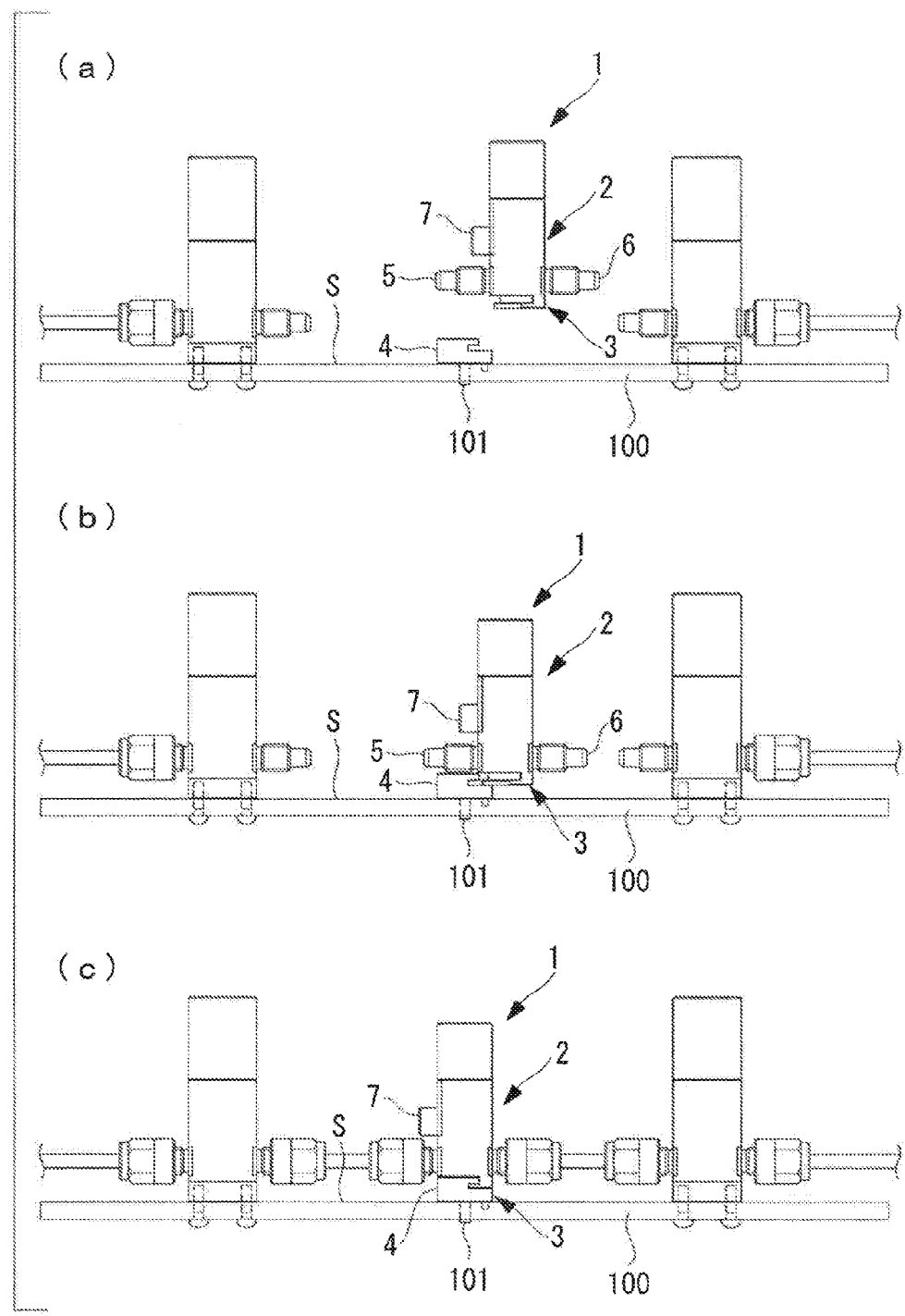
FIG. 7 is a view showing states of mounting/dismounting of the coupling part on/from the base part, where

FIG. 7 shows states of the coupling part 3 mounted/dismounted on/from the base part 4, and is a view from the side of the fluid device unit 1.

Figure 8:
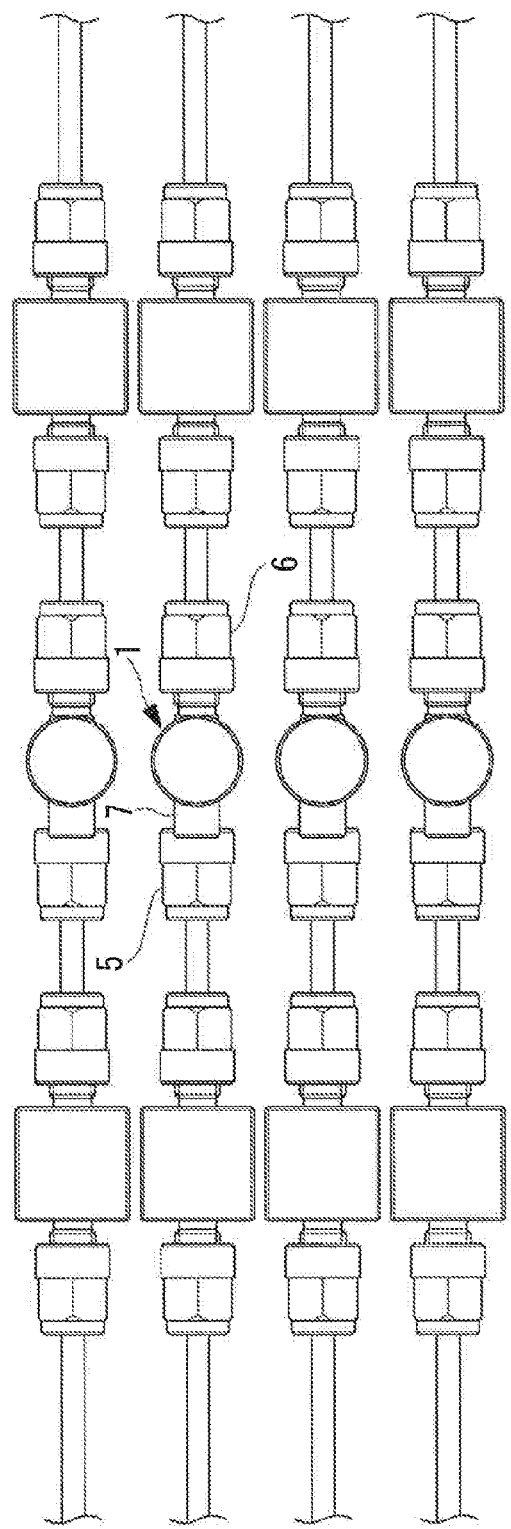
FIG. 8 is a top view of the fluid device unit in the state shown in FIG. 7(c).

In FIG. 7, FIG. 7(a) is a view showing a state before mounting, FIG. 7(b) is a view showing a state during mounting, and FIG. 7(c) is a view showing a state after mounting. FIG. 8 is a top view of the fluid device unit 1 with the coupling part 3 mounted on the base part 4 shown in FIG. 7(c).

As shown in FIG. 8, when the fluid device unit is connected to each of a plurality of pipes, the pipes are arranged adjacent to each other in order to reduce the installation area. In this case, it is necessary to mount/dismount the fluid device unit 1 which is connected to one of the pipes, in such a manner as to avoid contact with the adjacent pipes or the other fluid device units connected these pipes.

According to the present embodiment, the fluid device unit 1 can be mounted by moving it in the direction along the pipe. Thus, it is possible to mount/dismount the main body part 2 on/from the base part 4 along the extending direction of the pipe to which the fluid device unit is connected, while avoiding contact with the adjacent pipes or the other fluid device units connected to these pipes.

As described above, in the fluid device unit 1 of the present embodiment, the inner circumferential surface of the first holding member 4c of the base part 4 to be fixed to the installation surface S is partially opened in the radial direction. Furthermore, the opening width W1 of the opening part 4g of the elastically deformable first holding member 4c is narrower than the first length D1 being the diameter of the first coupling member 3a of the coupling part 3 which dismountably couples the main body part 2 to the base part 4.

Accordingly, when the first coupling member 3a of the coupling part 3 is pressed against the opening part 4g of the first holding member 4c of the base part 4 in the direction of entering the opening part 4g, the first holding member 4c is elastically deformed to gradually widen the opening width W1, allowing the first coupling member 3a to enter the opening part 4g. After the portion having the first length D1 of the largest width of the first coupling member 3a passes through the opening part 4g, the opening width W1 of the elastically deformed opening part 4g gradually narrows. This results in a state where the first coupling member 3a is held with its outer circumferential surface being surrounded by the inner circumferential surface of the first holding member 4c.

In this state, the first coupling member 3a is held with its outer circumferential surface being surrounded by the inner circumferential surface of the first holding member 4c. Accordingly, the main body part 2 is held so as not to move in the radial direction perpendicular to the central axis C of the main body part 2.

In this way, the fluid device unit 1 is mounted on the installation surface S just by such a simple action as pressing the first coupling member 3a of the coupling part 3 against the opening part 4g of the first holding member 4c of the base part 4 in the direction of entering the opening part 4g. Similarly, the fluid device unit 1 is removed from the installation surface S just by such a simple action as pressing the first coupling member 3a of the coupling part 3 against the opening part 4g of the first holding member 4c of the base part 4 in the direction of exiting from the opening part. Thus, it is possible to provide the fluid device unit 1 which requires a small installation area (footprint) and is easy to mount/dismount on/from the installation surface S.

In the fluid device unit 1 of the present embodiment, when the first coupling member 3a is held with its outer circumferential surface being surrounded by the inner circumferential surface of the first holding member 4c, the second coupling member 3b is held with its outer circumferential surface being surrounded by the inner circumferential surface of the second holding member 4d.

In this state, the second coupling member 3b is held with its outer circumferential surface being surrounded by the inner circumferential surface of the second holding member 4d, and the diameter of the second coupling member 3b (second length D2) is longer than the diameter of the first holding member 4c (first length D1) surrounding the first coupling member 3a. Thus, the surface of the second coupling member 3b on the main body part 2 side is restricted by the surface on the installation surface S side of the first holding member 4c, and the main body part 2 is held so as not to move in the direction along the central axis C.

In this way, the fluid device unit 1 is mounted on the installation surface S just by such a simple action as pressing the first coupling member 3a of the coupling part 3 against the opening part 4g of the first holding member 4c of the base part 4 in the direction of entering the opening part 4g. Similarly, the fluid device unit 1 is removed from the installation surface S just by such a simple action as pressing the first coupling member 3a of the coupling part 3 against the opening part 4g of the first holding member 4c of the base part 4 in the direction of exiting the opening part 4g. Thus, it is possible to provide the fluid device unit 1 which requires a small installation area (footprint) and is easy to mount/dismount on/from the installation surface S.

In the present embodiment, the base part 4 has the through-hole 4a, into which the fastening bolt 101 to be fastened to the fastening hole 102 of the installation surface S is inserted, and in a state where the main body part 2 is coupled to the base part 4, the central axis of the through-hole 4a and the central axis C of the main body part 2 coincide with each other. In this way, in a state where the main body part 2 is coupled to the base part 4, the position on the installation surface S of the through-hole 4a, into which the fastening bolt 101 for installing the base part 4 on the installation surface S is inserted, and the position on the installation surface S of the main body part 2 coincide with each other. Therefore, compared with a case where the positions on the installation surface of the through-hole and the main body part differ from each other, as in the conventional case, the installation area (footprint) of the fluid device unit can be reduced.

In the present embodiment, in a state where the groove 3c provided in the second coupling member 3b is engaged with the ridge 4f provided in the support member 4e, the first coupling member 3a enters the opening part 4g of the first holding member 4c. Since the ridge 4f extends along the opening direction of the opening part 4g of the first holding member 4c, the arrangement of the main body part 2 relative to the base part 4 (angle of the main body part 2 around the central axis C) can be set in a predetermined state.

In this way, the arrangement of the main body part 2 relative to the base part 4 to be fixed to the installation surface S (angle of the main body part 2 around the central axis C) can be set in a predetermined state without the need for the worker to make complicated adjustment.

In the present embodiment, the inflow port 5 and the outflow port 6 are arranged on the same straight line along the radial direction, and the direction along the same straight line and the extending direction of the groove 3c coincide with each other.

In a case where the fluid device unit is connected to each of a plurality of pipes, the pipes are usually arranged adjacent to each other in order to reduce the installation area. In this case, it is necessary to mount/dismount the fluid device unit which is connected to one of the pipes, in such a manner as to avoid contact with adjacent pipes or the other fluid device units connected to these pipes.

The above-described configuration makes it possible to mount/dismount the main body part on/from the base part in the extending direction of the pipe, to which the fluid device unit is connected, while avoiding contact with the adjacent pipes or the fluid device units connected to these pipes.

In the present embodiment, the base part 4 includes the rotation preventing pin 4b (projection) which engages with the engaging hole 103 of the installation surface S. In this way, as the base part 4 is fixed to both of the fastening hole 102 and the engaging hole 103 of the installation surface S, the base part 4 can be reliably fixed so as not to rotate relative to the installation surface S.

In the present embodiment, the coupling part 3 includes the restricting member 3d which, in a state where the first coupling member 3a is held by the first holding member 4c, restricts the main body part 2 from rotating around the central axis C relative to the base part 4. In this way, the main body part 2 can be prevented from rotating around the central axis C relative to the base part 4.

In the present embodiment, the fastening hole 19 to which the fastening bolt can be fastened is provided in the bottom surface of the second coupling member 3b. In this way, even when the base part 4 is not fixed to the installation surface S, the main body part 2 can be fixed to the installation surface S by protruding the tip of the fastening bolt (fastening tool) from the through-hole provided in the installation surface S and fastening the tip to the fastening hole 19 of the second coupling member 3b.

Other Embodiments

In the first embodiment, the coupling part 3 includes the first coupling member 3a and the second coupling member 3b, and the base part 4 includes the first holding member 4c and the second holding member 4d. However, the present invention is not limited to this aspect. For example, the base part 4 may include the first coupling member 3a and the second coupling member 3b, while the coupling part 3 may include the first holding member 4c and the second holding member 4d. In this case, the base part 4 includes the first coupling member 3a and the second coupling member 3b in this order from the side closer to the installation surface S, while the coupling part 3 includes the first holding member 4c and the second holding member 4d in this order from the side closer to the installation surface S.

In the first embodiment, the fluid device unit 1 is a normally-closed air-operated valve. However, the present invention is not limited to this aspect. For example, the fluid device unit 1 may be a normally-open air-operated valve. As long as it includes an inflow port and an outflow port for a fluid, the fluid device unit may be of other types than the air-operated valve.

In other respects, the present invention is not limited to the above-described embodiments, but can be appropriately changed within the scope of the present invention.

The invention claimed is:

1. A fluid device unit comprising:
   a main body part which has a passage provided inside for allowing a fluid flowing in from an inflow port to flow out of an outflow port, and extends in a direction of a central axis, the inflow port and the outflow port being disposed on side portion of the main body part;
   a base part which is fixed to an installation surface;
   a coupling part which is provided at one end side of the main body part and dismountably couples the main body part to the base part, wherein either the base part or the coupling part includes a first coupling member which is substantially circular in cross-section perpendicular to the central axis and has a diameter of a first length;
   the other of the base part and the coupling part includes a first holding member which holds an outer circumferential surface of the first coupling member, the outer circumferential surface of the first coupling member being surrounded by an inner circumferential surface of the first holding member, the inner circumferential surface having a substantially circular shape is cross section perpendicular to the central axis;
   the inner circumferential surface of the first holding member is partially opened in a direction perpendicular to the central axis, and an opening width of an opening part of the first holding member, which is elastically deformable, is narrower than the first length; and
   wherein:
      the coupling part includes, in order from a side closer to the main body part, the first coupling member and a second coupling member which is substantially circular in cross-section perpendicular to the central axis and has a diameter of a second length longer than the first length; and
      the base part includes, in order from a side closer to the main body part, the first holding member and a second holding member, the second member holding the second coupling member so as to surround an outer circumferential surface of the second coupling member with an inner circumferential surface of the second holding member; and
      the inner circumferential surface of the second holding member is partially opened in the radial direction, and an opening width of an opening part of the second holding member is wider than the opening width of the opening part of the first holding member.

2. The fluid device unit according to claim 1, wherein the base part includes a support member which has a substantially circular shape in cross-section perpendicular to the central axis, and is fixed to the installation surface to support the first holding member and the second holding member,
   a ridge which extends along an opening direction of the opening part of the first holding member is provided on a surface of the support member opposite to the second coupling member, and
   a groove which engages with the ridge is provided on a surface of the second coupling member opposite to the support member.

3. The fluid device unit according to claim 2, wherein the inflow port and the outflow port are arranged on a same straight line along the direction perpendicular to the central axis, and a direction along the same straight line and an extending direction of the groove coincide with each other.

4. The fluid device unit according to claim 3, wherein the base part includes a projection which engages with an engaging hole of the installation surface.

5. The fluid device unit according to claim 3 wherein a fastening hole to which a fastening tool can be fastened is provided in a bottom surface of the second coupling member.

6. The fluid device unit according to claim 2, wherein the base part includes a projection which engages with an engaging hole of the installation surface.

7. The fluid device unit according to claim 2 wherein a fastening hole to which a fastening tool can be fastened is provided in a bottom surface of the second coupling member.

8. The fluid device unit according to claim 1 wherein a fastening hole to which a fastening tool can be fastened is provided in a bottom surface of the second coupling member.

9. A fluid device unit comprising:
   a main body part which has a passage provided inside for allowing a fluid flowing in from an inflow port to flow out of an outflow port, and extends in a direction of a central axis, the inflow port and the outflow port being disposed on side portion of the main body part;
   a base part which is fixed to an installation surface;
   a coupling part which is provided at one end side of the main body part and dismountably couples the main body part to the base part, wherein either the base part or the coupling part includes a first coupling member which is substantially circular in cross-section perpendicular to the central axis and has a diameter of a first length;
   the other of the base part and the coupling part includes a first holding member which holds an outer circumferential surface of the first coupling member, the outer circumferential surface of the first coupling member being surrounded by an inner circumferential surface of the first holding member, the inner circumferential surface having a substantially circular shape is cross section perpendicular to the central axis;
   the inner circumferential surface of the first holding member is partially opened in a direction perpendicular to the central axis, and an opening width of an opening part of the first holding member, which is elastically deformable, is narrower than the first length; and
   wherein the base part includes a through-hole into which a fastening tool to be fastened to a fastening hole of the installation surface is inserted, and in a state where the main body part is coupled to the base part, a central axis of the through-hole and the central axis of the main body part coincide with each other.

10. The fluid device unit according to claim 9, wherein the base part includes a projection which engages with an engaging hole of the installation surface.

11. A fluid device unit comprising:
    a main body part which has a passage provided inside for allowing a fluid flowing in from an inflow port to flow out of an outflow port, and extends in a direction of a central axis, the inflow port and the outflow port being disposed on side portion of the main body part;
    a base part which is fixed to an installation surface;

a coupling part which is provided at one end side of the main body part and dismountably couples the main body part to the base part, wherein either the base part or the coupling part includes a first coupling member which is substantially circular in cross-section perpendicular to the central axis and has a diameter of a first length;

the other of the base part and the coupling part includes a first holding member which holds an outer circumferential surface of the first coupling member, the outer circumferential surface of the first coupling member being surrounded by an inner circumferential surface of the first holding member, the inner circumferential surface having a substantially circular shape is cross section perpendicular to the central axis;

the inner circumferential surface of the first holding member is partially opened in a direction perpendicular to the central axis, and an opening width of an opening part of the first holding member, which is elastically deformable, is narrower than the first length; and wherein the coupling part includes a restricting member which, in a state where the first coupling member is held by the first holding member, restricts the main body part from rotating around the central axis relative to the base part.

12. A fluid device unit comprising:

a main body part which has a passage provided inside for allowing a fluid flowing in from an inflow port to flow out of an outflow port, and extends in a direction of a central axis, the inflow port and the outflow port being disposed on side portion of the main body part;

a base part which is fixed to an installation surface;

a coupling part which is provided at one end side of the main body part and dismountably couples the main body part to the base part, wherein either the base part or the coupling part includes a first coupling member which is substantially circular in cross-section perpendicular to the central axis and has a diameter of a first length;

the other of the base part and the coupling part includes a first holding member which holds an outer circumferential surface of the first coupling member, the outer circumferential surface of the first coupling member being surrounded by an inner circumferential surface of the first holding member, the inner circumferential surface having a substantially circular shape is cross section perpendicular to the central axis;

the inner circumferential surface of the first holding member is partially opened in a direction perpendicular to the central axis, and an opening width of an opening part of the first holding member, which is elastically deformable, is narrower than the first length; and wherein the main body part includes an opening-closing mechanism which switches the passage between open and closed states.

* * * * *